(12) United States Patent
Takayanagi

(10) Patent No.: US 9,370,030 B2
(45) Date of Patent: Jun. 14, 2016

(54) COMMUNICATION SYSTEM, COMMUNICATION APPARATUS, AND COMMUNICATION METHOD

(71) Applicant: Asako Takayanagi, Kanagawa (JP)

(72) Inventor: Asako Takayanagi, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/347,229

(22) PCT Filed: Sep. 26, 2012

(86) PCT No.: PCT/JP2012/074686
§ 371 (c)(1),
(2) Date: Mar. 25, 2014

(87) PCT Pub. No.: WO2013/047580
PCT Pub. Date: Apr. 4, 2013

(65) Prior Publication Data
US 2014/0273842 A1    Sep. 18, 2014

(30) Foreign Application Priority Data
Sep. 26, 2011    (JP) .................................. 2011-208702

(51) Int. Cl.
*H04L 1/00* (2006.01)
*H04W 76/02* (2009.01)
(Continued)

(52) U.S. Cl.
CPC .......... *H04W 76/02* (2013.01); *H04W 52/0209* (2013.01); *H04W 52/0216* (2013.01);
(Continued)

(58) Field of Classification Search
CPC ............ H04L 47/10; H04L 2012/5678; H04L 2012/5679
USPC ........ 370/235, 395.21, 395.4, 395.41, 395.42
See application file for complete search history.

(56) References Cited

U.S. PATENT DOCUMENTS 6,584,097 B1 * 6/2003 Malik ........................... 370/352
2002/0141375 A1 * 10/2002 Choi ............................ 370/347

FOREIGN PATENT DOCUMENTS

| CN | 102598805 A | 7/2012 |
|----|-------------|--------|
| EP | 2498552 A1 | 9/2012 |
| JP | 2004128709 A | 4/2004 |
| JP | 2004152268 A | 5/2004 |
| JP | 2006033146 A | 2/2006 |
| JP | 2006186971 A | 7/2006 |

(Continued)

OTHER PUBLICATIONS

International Search Report issued for PCT/JP2012/074686, Nov. 28, 2012, 3 pages.

*Primary Examiner* — Lee Nguyen
(74) *Attorney, Agent, or Firm* — Wilmer Cutler Pickering Hale and Dorr LLP

(57) ABSTRACT

Provided is a communication system that includes a plurality of communication apparatuses and that transmits and receives a connection request command between the plurality of communication apparatuses to establish a connection between the plurality of communication apparatuses, wherein a transmission source communication apparatus as a transmission source of the connection request command from among the plurality of communication apparatuses transmits transmission timing information that indicates timing at which the connection request command is transmitted, and a transmission destination communication apparatus as a transmission destination of the connection request command from among the plurality of communication apparatuses receives the transmission timing information transmitted from the transmission source communication apparatus and determines timing at which an operation of waiting for receipt of the connection request command transmitted from the transmission source communication apparatus is performed based on the timing indicated by the received transmission timing information.

12 Claims, 10 Drawing Sheets

(51) Int. Cl.
  *H04W 52/02* (2009.01)
  *H04B 7/00* (2006.01)
  *H04M 1/725* (2006.01)

(52) U.S. Cl.
  CPC ........ *H04W52/0229* (2013.01); *H04M 1/7253* (2013.01); *H04M 2250/02* (2013.01); *H04M 2250/04* (2013.01); *H04W 52/0251* (2013.01)

(56) References Cited

FOREIGN PATENT DOCUMENTS

| JP | 2007199967 A | 8/2007 |
| JP | 2010178039 A | 8/2010 |
| WO | WO-2011052700 A1 | 5/2011 |
| WO | WO-2011102280 A1 | 8/2011 |

* cited by examiner

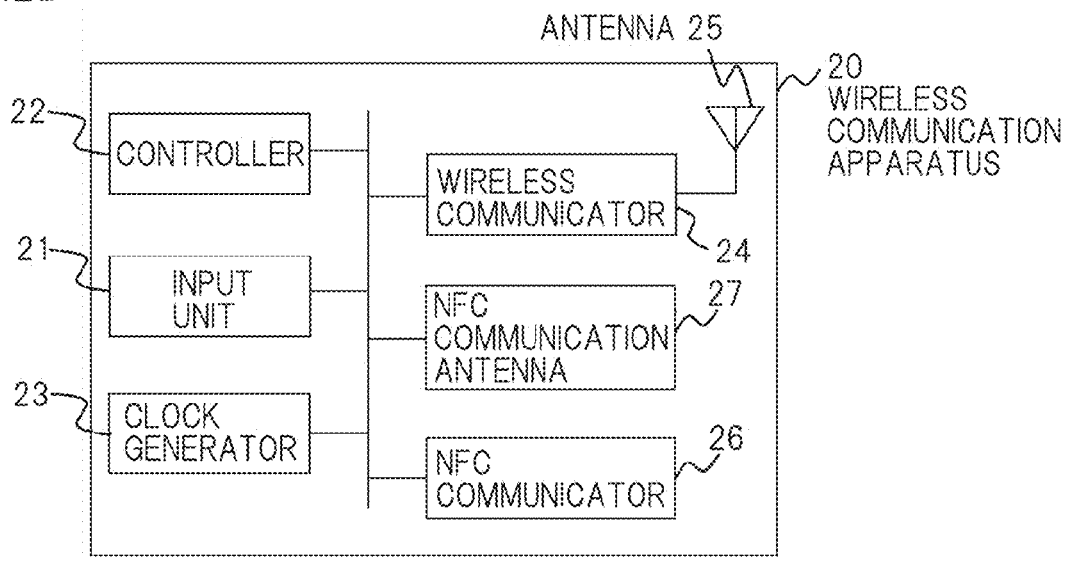

Fig.3B

| Device Address | Profile | Connection Request Parameter Information | |
|---|---|---|---|
| xx:xx:xx:xx:xx:FF | Proximity Profile | Connection Request Interval Time | 1.28s |
| | | Connection Request Time-Out Time | 30.72s |
| | | Connection Request Rest Time | 61.44s |
| xx:xx:xx:xx:xx:4C | Time Service Profile | Connection Request Interval Time | 2.56s |
| | | Connection Request Time-Out Time | 30.72s |
| | | Connection Request Rest Time | 60min |
| | Personal User Interface Device Profile | Connection Request Interval Time | 250ms |
| | | Connection Request Time-Out Time | 30.72s |
| | | Connection Request Rest Time | 0.0s |
| ⋮ | ⋮ | ⋮ | ⋮ |

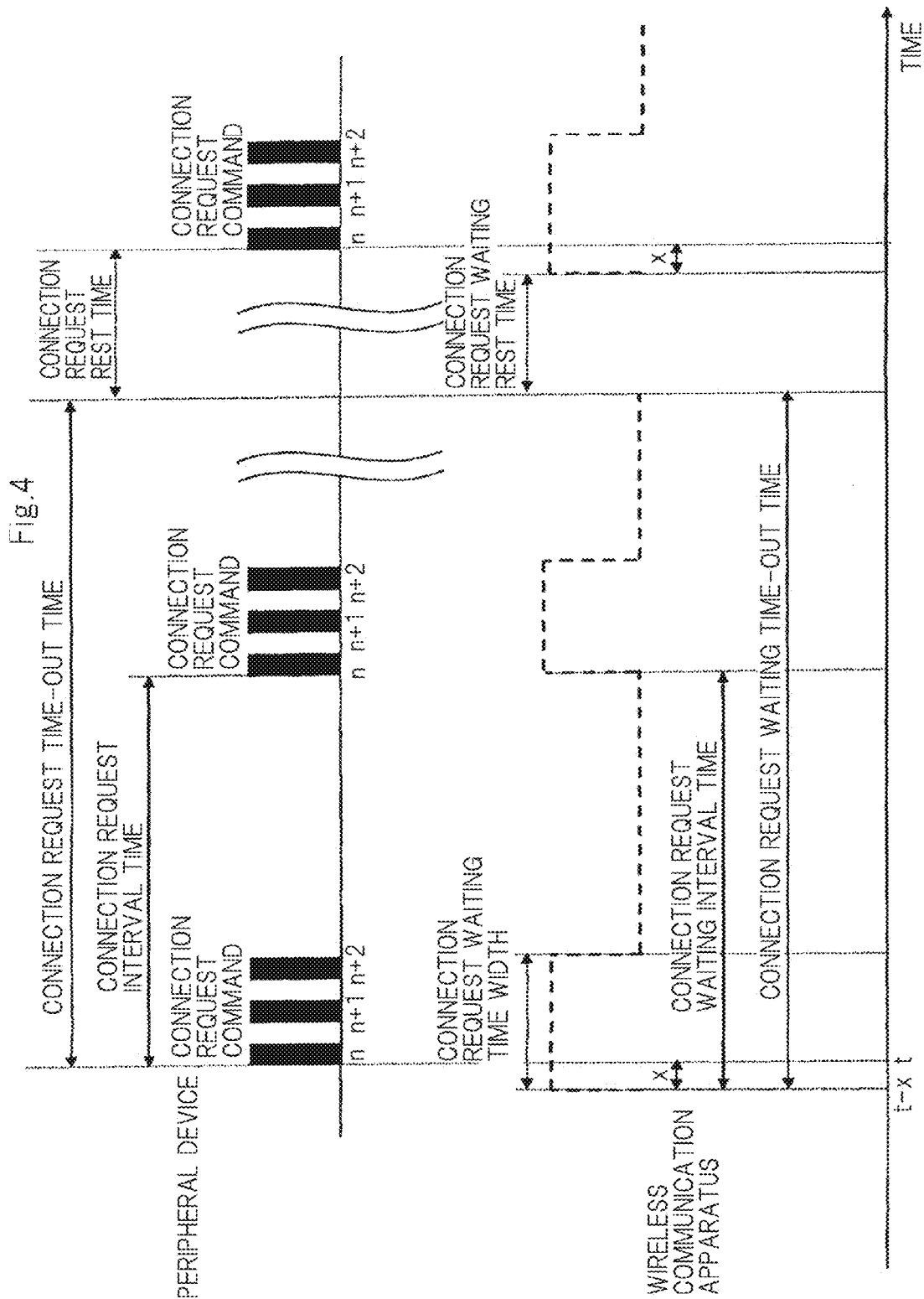

COMMUNICATION SYSTEM, COMMUNICATION APPARATUS, AND COMMUNICATION METHOD

CROSS-REFERENCE TO RELATED APPLICATIONS

This application is a national stage application of International Application No. PCT/JP2012/074686 entitled "Communication System, Communication Apparatus and Communication Method," filed on Sep. 26, 2012, which claims the benefit of the priority of Japanese Patent Application No. 2011-208702, filed on Sep. 26, 2011, the disclosures of each of which are hereby incorporated by reference in their entirety.

TECHNICAL FIELD

The present invention relates to a communication system including a communication apparatus that makes a connection request for establishing a connection and including a communication apparatus that performs an operation of waiting for receipt of a connection request.

BACKGROUND ART

There are low-power-consumption wireless communication techniques, such as Zig Bee and Bluetooth Low Energy, used to exchange low-capacity information every certain time. "Zig Bee" and "Bluetooth" are both registered trademarks.

In such a wireless communication technique, when a master apparatus and a slave apparatus establish a connection for communication, the slave apparatus just needs to make a request for connection to the master apparatus only when communication is required. Therefore, power saving can be realized in the slave apparatus.

On the other hand, the master apparatus does not know when the slave apparatus will make the connection request, and the master apparatus needs to always perform an operation of waiting for receipt of the connection request. Therefore, realization of power saving is difficult in the master apparatus. When the master apparatus is a battery-driven apparatus, such as a portable phone and a smartphone, the continuous use time is reduced if the power saving is not realized, and convenience is lost.

A technique for realizing the power saving of the master apparatus is disclosed in, for example, Patent Literature 1.

In the technique disclosed in Patent Literature 1, a master communication terminal that establishes communication links with slave communication terminals sets the same communication period for all communication links. The master communication terminal further sets communication start time and communication duration time for each communication link so that communication slots used in the communication links form a continuous range. The master communication terminal further negotiates with the slave communication terminals according to setting. The master communication terminal performs a power saving operation of the master communication terminal in a period of unused slots organized as one range, based on the setting.

CITATION LIST

Patent Literature

Patent Literature 1: JP2004-152268A

SUMMARY OF INVENTION

The use of the technique disclosed in Patent Literature 1 can realize power saving of a master apparatus in a state in which the master apparatus is establishing a connection with a slave apparatus. However, even if the technique disclosed in Patent Literature 1 is used, the power saving of the master apparatus cannot be realized when the master apparatus waits for a connection request.

The power consumption of the master apparatus can be reduced by intermittently performing the operation of waiting for receipt of the connection request. However, the timing of making the connection request usually varies depending on the apparatus that makes the connection request. Therefore, there is a problem in which the power is not efficiently consumed according to the apparatus that makes the connection request even if the operation of waiting for receipt of the connection request is intermittently performed.

An object of the present invention is to provide a communication system, a communication apparatus, and a communication method that can efficiently consume power when waiting for receipt of a connection request.

To achieve the object, the present invention provides a communication system that includes a plurality of communication apparatuses and that transmits and receives a connection request command between the plurality of communication apparatuses to establish a connection between the plurality of communication apparatuses, wherein a transmission source communication apparatus as a transmission source of the connection request command from among the plurality of communication apparatuses transmits transmission timing information that indicates timing at which the connection request command is transmitted, and a transmission destination communication apparatus as a transmission destination of the connection request command from among the plurality of communication apparatuses receives the transmission timing information transmitted from the transmission source communication apparatus and determines, based on the timing indicated by the received transmission timing information, waiting timing at which an operation of waiting for receipt of the connection request command transmitted from the transmission source communication apparatus is performed.

To achieve the object, the present invention provides a communication apparatus that receives a transmitted connection request command to establish a connection with a transmission source communication apparatus as a transmission source of the connection request command, the communication apparatus including:

a first receiver that receives transmission timing information that is transmitted from the transmission source communication apparatus and that indicates timing at which the transmission source communication apparatus transmits the connection request command; and a controller that determines, based on the transmission timing information received by the first receiver, waiting timing at which an operation of waiting for receipt of the connection request command transmitted from the transmission source communication apparatus is performed.

To achieve the object, the present invention provides a communication method in a communication system that includes a plurality of communication apparatuses and that transmits and receives a connection request command between the plurality of communication apparatuses to establish a connection between the plurality of communication apparatuses, the communication method including:

a first transmission process of transmitting, by a transmission source communication apparatus, as a transmission source of the connection request command from among the plurality of communication apparatuses, transmission timing information that indicates timing at which the connection request command is transmitted;

a first reception process of receiving, by a transmission destination communication apparatus, as a transmission destination of the connection request command from among the plurality of communication apparatuses, the transmission timing information transmitted from the transmission source communication apparatus; and a determination process of determining, by the transmission destination communication apparatus, waiting timing at which an operation of waiting for receipt of the connection request command transmitted from the transmission source communication apparatus is performed based on the timing indicated by the received transmission timing information.

To achieve the object, the present invention provides a communication method in a communication apparatus that receives a transmitted connection request command to establish a connection with a transmission source communication apparatus as a transmission source of the connection request command, the communication method including:

a first reception process of receiving transmission timing information that is transmitted from the transmission source communication apparatus and that indicates timing at which transmission source communication apparatus transmits the connection request command; and a determination process of determining, based on the received transmission timing information, waiting timing at which an operation of waiting for receipt of the connection request command transmitted from the transmission source communication apparatus is performed.

BRIEF DESCRIPTION OF DRAWINGS

FIG. 2B is a block diagram showing a configuration example of a wireless communication apparatus shown in FIG. 1.

FIG. 3A is a diagram for describing connection request parameter information stored in a controller shown in FIG. 2B.

FIG. 3B is a diagram for describing other connection request parameter information stored in the controller shown in FIG. 2B.

FIG. 4 is a time chart for describing parameter values of connection request waiting parameters determined by the controller shown in FIG. 2B.

REFERENCE SIGNS LIST

Figure 1:
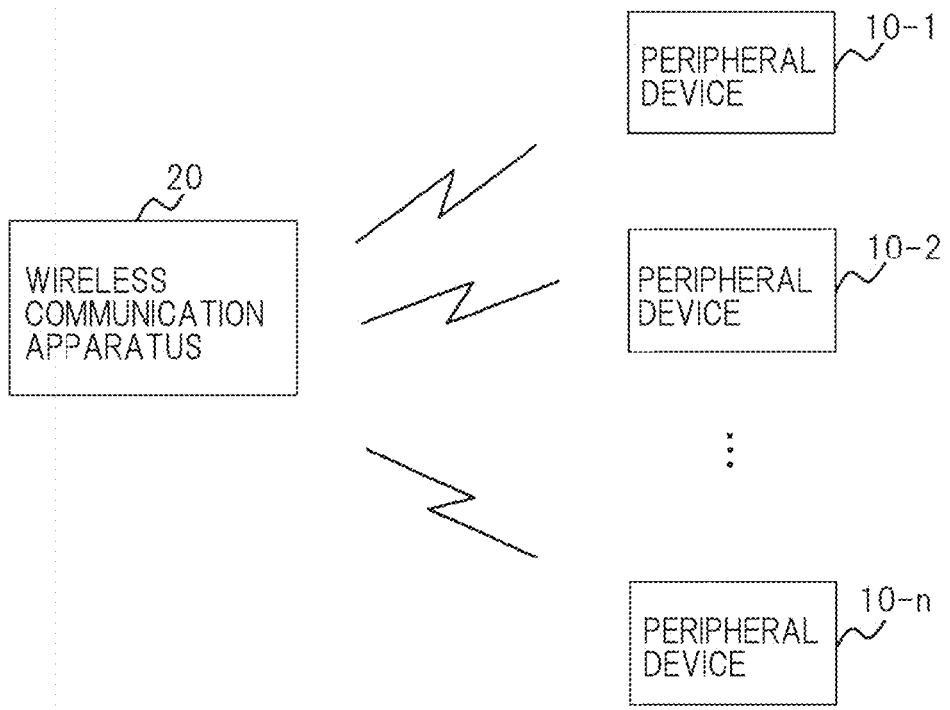
FIG. 1 is a block diagram showing a configuration of a first exemplary embodiment of a wireless communication system of the present invention.

10-1 to 10-$n$ peripheral devices
11, 22, 51, 62 controllers
12, 24, 52, 64 wireless communicators
13, 25, 53, 65 antennas
14 NFC communication chip
20, 60 wireless communication apparatuses
21, 61 input units
23, 63 clock generators
26 NFC communicator
27 NFC communication antenna
50-1 to 50-$n$ wireless terminals

DESCRIPTION OF EMBODIMENTS

Hereinafter, exemplary embodiments will be described with reference to the drawings.

First Exemplary Embodiment

FIG. 1 is a block diagram showing a configuration of a first exemplary embodiment of a wireless communication system of the present invention.

As shown in FIG. 1, the wireless communication system of the exemplary embodiment includes peripheral devices 10-1 to 10-$n$ that are transmission source communication apparatuses and wireless communication apparatus 20 that is a transmission destination communication apparatus.

Wireless communication apparatus 20 performs an operation of waiting for receipt of a connection request frame including a connection request command transmitted from each of peripheral devices 10-1 to 10-$n$ to establish connection with peripheral devices 10-1 to 10-$n$. Specifically, the operation of waiting for receipt of the connection request frame is a scan operation of monitoring the connection request frame. When connection with peripheral devices 10-1 to 10-$n$ is established, wireless communication apparatus 20 transmits predetermined information to the connected peripheral device according to the peripheral device.

Wireless communication apparatus 20 is, for example, a portable terminal compliant with Bluetooth Low Energy, and peripheral devices 10-1 to 10-$n$ are, for example, wristwatches compliant with Bluetooth Low Energy.

In this case, after the establishment of connection with the wristwatch, the portable terminal transmits incoming call information as predetermined information to the wristwatch. The incoming call information is information for notifying the portable terminal of the incoming call. The wristwatch that has received the incoming call information transmitted from the portable terminal performs operation of notifying the user of the reception of the incoming call information.

Figure 2A:
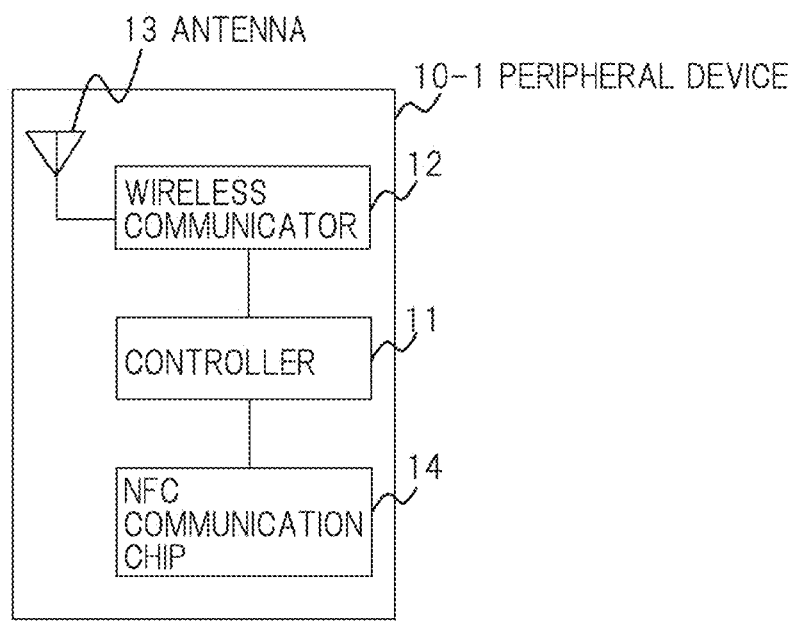
FIG. 2A is a block diagram showing a configuration example of a peripheral device shown in FIG. 1.

FIG. 2A is a block diagram showing a configuration example of peripheral device 10-1, and FIG. 2B is a block diagram showing a configuration example of wireless communication apparatus 20. Peripheral devices 10-2 to 10-n also have the same configuration as that of peripheral device 10-1.

As shown in FIG. 2A, peripheral device 10-1 includes controller 11, wireless communicator 12 that performs communication by short-distance wireless communication, antenna 13 for transmitting and receiving wireless signals by the short-distance wireless communication, and NFC (Near Field Communication) communication chip 14. The short-distance wireless communication specifically is communication using Bluetooth. The NFC is an international standard for performing wireless communication at a distance of about 10 cm by magnetic field coupling.

Controller 11 stores connection request parameters for defining timing, at which peripheral device 10-1 transmits a connection request command, and connection request parameter information that is transmission timing information indicating the parameter values.

Specifically, the connection request parameters denote connection request interval time, connection request time-out time, and connection request rest time. The connection request interval time is a parameter for defining time between the start of the transmission of the connection request command and the start of the transmission of the next connection request command. The connection request time-out time is a parameter for defining time of continuing the transmission of the connection request command at intervals of the connection request interval time. The connection request rest time is a parameter for defining time of not transmitting the connection request command after the connection request time-out time.

Controller 11 outputs a transmission instruction for instructing transmission of the connection request command to wireless communicator 12 according to the stored connection request parameter information.

Wireless communicator 12 transmits and receives wireless signals through antenna 13. When the transmission instruction output from controller 11 is received, wireless communicator 12 generates a connection request frame that is a frame that is used to transmit the connection request command and that includes the connection request command. The header of the connection request frame includes a device address for identifying peripheral device 10-1 as a device address of the transmission source. The device address is, for example, a MAC (Media Access Control) address. The wireless communicator 12 transmits a wireless signal including the generated connection request frame through antenna 13.

NFC communication chip 14 has a card function of, for example, FeliCa (registered trademark) and includes an antenna (not shown) for wireless communication by magnetic field coupling. NFC communication chip 14 stores a device address for identifying peripheral device 10-1 and authentication information necessary for authentication with an apparatus or the like to be connected. The device address and the authentication information are, for example, information defined as transmission information in OOB (Out Of Band) using NFC communication used in Simple Pairing of a short-distance wireless communication technique.

NFC communication chip 14 stores the same connection request parameter information as that stored in controller 11. When peripheral device 10-1 approaches an apparatus or the like including an NFC communication antenna, NFC communication chip 14 transmits, to the apparatus or the like, a wireless signal including the stored authentication information, device address, and the connection request parameter information through the antenna. The apparatus or the like including the NFC communication antenna is, for example, wireless communication apparatus 20.

As shown in FIG. 2B, wireless communication apparatus 20 includes input unit 21, controller 22, clock generator 23, wireless communicator 24 as a second receiver that performs communication by short-distance wireless communication, and antenna 25 for transmitting and receiving wireless signals by short-distance wireless communication. Wireless communication apparatus 20 further includes NFC communicator 26 as a first receiver and NFC communication antenna 27.

Clock generator 23 generates a clock used by wireless communication apparatus 20 to perform short-distance wireless communication.

NFC communicator 26 has, for example, both the card function and reader/writer function of Felica. NFC communicator 26 receives, through NFC communication antenna 27, the authentication information, the device addresses, and the connection request parameter information transmitted as wireless signals from peripheral devices 10-1 to 10-n. NFC communicator 26 outputs the received authentication information, the device addresses, and the connection request parameter information to controller 22.

Input unit 21 receives input of various instructions, selections, and the like from the user of wireless communication apparatus 20 and outputs a notification indicating the details of the received various instructions, selections, and the like to controller 22. Input unit 21 includes, for example, a keyboard and up, down, left, and right buttons for receiving input of various instructions, selections, and the like. Input unit 21 may further include a touch panel, and icons or the like that are displayed on the touch panel may be pressed so that input unit 21 receives input of various instructions, selections, and the like. Input unit 21 may further include, for example, a sensor and may receive input of various instructions, selections, and the like according to the detection of the sensor.

Controller 22 receives the authentication information, the device address, and the connection request parameter information output from NFC communicator 26. Controller 22 uses the authentication information and the device address to authenticate the peripheral device identified by the received device address. When the authentication is completed, controller 22 associates and stores the received device address and the connection request parameter information in a register included in controller 22.

FIG. 3A is a diagram for describing the connection request parameter information stored in controller 22 shown in FIG. 2B.

As shown in FIG. 3A, controller 22 associates and stores the device addresses and the connection request parameter information.

In the exemplary embodiment, controller 22 associates and stores the device addresses and the connection request parameter information as shown in FIG. 3A. However, controller 22 can associate and store functions (for example, Profile) and the connection request parameter information, in addition to the device addresses, as shown in FIG. 3B. The functions are, for example, functions shared by the wireless communication apparatus and the peripheral devices.

Controller 22 also receives a selection instruction notification output from input unit 21. The selection instruction notification is a notification including the device address for identifying the peripheral device selected by the user from among the device addresses stored in the register included in controller 22.

When the selection instruction notification is received, controller 22 shifts the operation state of wireless communication apparatus 20 from the normal state, which is a usual state, to a connection waiting state, which is a state in which an operation of waiting for receipt of the connection request frame is performed.

When wireless communication apparatus 20 is in the connection waiting state, controller 22 checks whether clock reference value t corresponding to the device address included in the received selection instruction notification is stored in the register. Clock reference value t is a clock value when the connection request frame transmitted from the peripheral device identified by the device address is received.

As a result of the check, if clock reference value t corresponding to the device address included in the received selection instruction notification is stored in the register, controller 22 determines the parameter values of connection request waiting parameters for defining the timing at which an operation of waiting for receipt of the connection request frame is performed. More specifically, controller 22 determines waiting timing that is the timing at which an operation of waiting for receipt of the connection request command is performed.

FIG. 4 is a time chart for describing the parameter values of the connection request waiting parameters determined by controller 22 shown in FIG. 2B. Here, as shown in FIG. 4, the connection request commands are in units of specific three channels based on frequency hopping.

In the upper part of FIG. 4, the parameter values indicated by the connection request parameter information stored in the register of controller 22 are illustrated by arrows.

Based on the parameter values of the connection request parameters, controller 22 determines the parameter values of connection request waiting time width, connection request waiting interval time, connection request waiting time-out time, and connection request waiting rest time that are connection request waiting parameters. In the lower part of FIG. 4, the parameter values of the connection request waiting parameters are illustrated by arrows. In FIG. 4, t denotes clock reference value t.

The connection request waiting time width is a parameter for defining time width in which the operation of waiting for receipt of the connection request frame is performed. The connection request waiting interval time is a parameter for defining time from the start of the operation of waiting for receipt of the connection request frame to the start of the operation of waiting for receipt of the next connection request frame. The connection request waiting time-out time is a parameter for defining time of continuing the operation of waiting for receipt of the connection request frame at intervals of the connection request waiting interval time. The connection request waiting rest time is a parameter for defining time of not performing the operation of waiting for receipt of the connection request frame.

Controller 22 determines the parameter values of the connection request waiting parameters, for example, as follows based on the stored connection request parameter information.

[Connection request waiting interval time]=[connection request interval time] is set. However, the first connection request waiting interval time in the connection request waiting time-out time is longer than the connection request interval time by the length of time of x. This can reduce the possibility of missing the reception of the connection request frame. Controller 22 can set an arbitrary time for x. For example, x is 10 ms. Furthermore, [connection request waiting time-out time]=[connection request time-out time]+x is set, and [connection request waiting rest time]=[connection request rest time]−x is set.

Therefore, (t−x) in FIG. 4 indicates the timing of starting the operation of waiting for receipt of the connection request frame. Hereinafter, the timing will be called an operation start reference value.

Controller 22 then instructs wireless communicator 24 to start the operation of waiting for receipt of the connection request frame by using the determined parameter values. Details of the operation of controller 22 when wireless communication apparatus 20 is in the connection waiting state, including operation when clock reference value t corresponding to the device address included in the received selection instruction notification is not stored in the register, will be described in an operation flow described later.

With reference again to FIG. 2B, wireless communicator 24 performs the operation of waiting for receipt of the connection request frame transmitted as a wireless signal, according to the instruction from controller 22.

Hereinafter, operation of the wireless communication system configured as described above will be described.

Figure 5A:
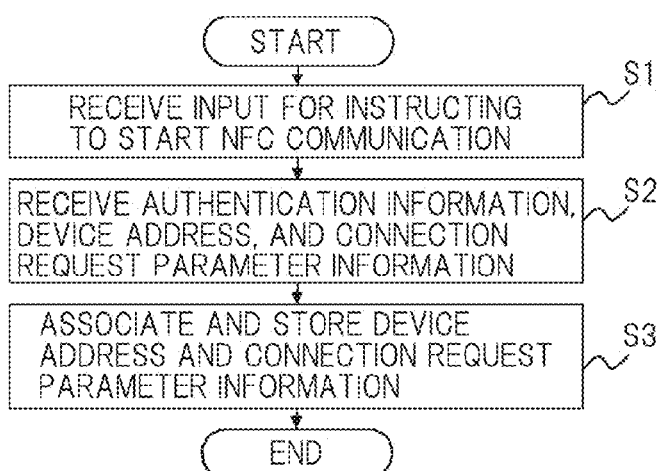
FIG. 5A is a flow chart for describing operation when the wireless communication apparatus shown in FIG. 1 stores the connection request parameter information of the peripheral device.
Figure 5B:
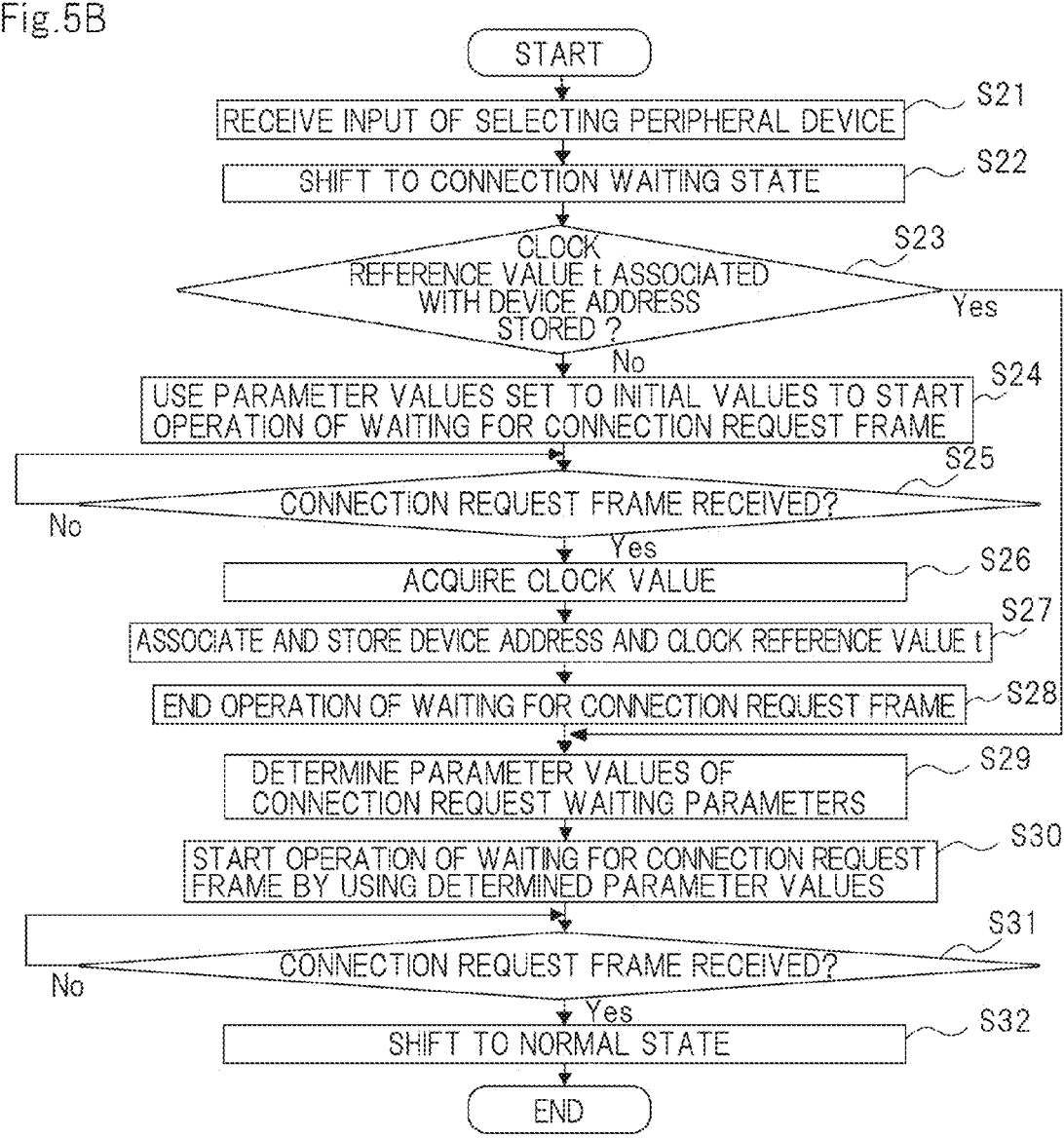
FIG. 5B is a flow chart for describing operation when the wireless communication apparatus shown in FIG. 1 waits for a connection request frame.

FIG. 5A is a flow chart for describing operation when wireless communication apparatus 20 stores the connection request parameter information of peripheral device 10-1, and FIG. 5B is a flow chart for describing operation when wireless communication apparatus 20 waits for the connection request frame.

First, the operation when wireless communication apparatus 20 stores the connection request parameter information of peripheral device 10-1 will be described with reference to FIG. 5A.

Input unit 21 receives input for instructing to start the NFC communication from the user (step S1).

Input unit 21 then outputs, to controller 22, an NFC communication start notification indicating receipt of the instruction for starting the NFC communication.

Controller 22 that has received the NFC communication start notification output from input unit 21 causes NFC communicator 26 to operate.

Next, the user brings peripheral device 10-1 and wireless communication apparatus 20 close to each other.

As a result, NFC communication chip 14 of peripheral device 10-1 transmits a wireless signal including the stored authentication information, the device address, and the connection request parameter information to wireless communication apparatus 20.

NFC communicator 26 of wireless communication apparatus 20 receives the authentication information, the device address, and the connection request parameter information transmitted as a wireless signal from peripheral device 10-1 through NFC communication antenna 27 (step S2).

NFC communicator 26 then outputs the received authentication information, the device address, and the connection request parameter information to controller 22.

Controller 22 that has received the authentication information, the device address, and the connection request parameter information output from NFC communicator 26 uses the received authentication information to perform authentication.

When the authentication is completed, controller 22 associates and stores the received device address and the connection request parameter information in the register as shown in FIG. 3A (step S3).

Here, the operation when wireless communication apparatus 20 stores the connection request parameter information of peripheral device 10-1 is described as an example. Wireless communication apparatus 20 can store the connection request parameter information of peripheral devices 10-2 to 10-n by performing the same operation as described above.

Next, the operation when wireless communication apparatus 20 waits for receipt of the connection request frame will be described with reference to FIG. 5B.

Input unit 21 receives, from the user, input of selecting one of the peripheral devices identified by the device addresses stored in the register of controller 22 (step S21).

Input unit 21 then outputs, to controller 22, a selection instruction notification including the device address for identifying the selected peripheral device.

Controller 22 that has received the selection instruction notification output from input unit 21 shifts the operation state of wireless communication apparatus 20 from the normal state to the connection waiting state (step S22).

Controller 22 then checks whether clock reference value t associated with the device address included in the received selection instruction notification is stored in the register (step S23).

As a result of the check in step S23, if clock reference value t associated with the device address included in the received selection instruction notification is not stored in the register, controller 22 sets the parameter values of the connection request waiting parameters to predetermined initial values.

Controller 22 then outputs, to wireless communicator 24, a start instruction for instructing to perform the operation of waiting for receipt of the connection request frame by using the parameter values set to the initial values. The start instruction includes the parameter values set to the initial values. Examples of the initial values include 11.25 ms as a parameter value of the connection request waiting interval time and 11.25 ms as a parameter value of the connection request waiting time width. In this way, setting the parameter value of the connection request waiting interval time and the parameter value of the connection waiting time width to the same value can improve the probability that wireless communicator 24 can receive the connection request frame.

Wireless communicator 24 that has received the start instruction output from controller 22 starts the operation of waiting for receipt of the connection request frame by using the parameter values included in the received start instruction. More specifically, wireless communicator 24 starts the operation of waiting for receipt of the connection request frame by using the parameter values set to the initial values (step S24).

Wireless communicator 24 then checks whether the connection request frame transmitted as a wireless signal is received through antenna 25 (step S25).

As a result of the check in step S25, if the connection request frame is not received, the process shifts to the operation of step S25. More specifically, wireless communicator 24 continues to check whether the connection request frame is received.

On the other hand, as a result of the check in step S25, if the connection request frame is received, wireless communicator 24 acquires a clock value from clock generator 23 (step S26).

Wireless communicator 24 then outputs the acquired clock value to controller 22.

Controller 22 that has received the device address and the clock value output from wireless communicator 24 sets clock reference value t to the received clock value and stores clock reference value t in the register in association with the device address included in the received selection instruction notification (step S27).

Next, controller 22 calculates an operation start reference value by subtracting x from clock reference value t.

Next, controller 22 outputs an ending instruction to wireless communicator 24 instructing that the operation to wait for receipt of the connection request frame.

Wireless communicator 24 that has received the ending instruction output from controller 22 ends the operation of waiting for receipt of the connection request frame (step S28).

Next, controller 22 determines the parameter values of the connection request waiting parameters based on the parameter values indicated by the connection request parameter information associated with the device address included in the received selection instruction notification and based on calculated operation start reference value (t−x) (step S29).

Controller 22 then outputs, to wireless communicator 24, a start instruction instructing that an operation to wait for receipt of the connection request frame by using the determined parameter values be started. The start instruction includes the determined parameter values.

Note that as a result of the check in step S23, if clock reference value t associated with the device address included in the received selection instruction notification is stored in the register, the process shifts to the operation of step S29.

Wireless communicator 24 that has received the start instruction output from controller 22 starts the operation of waiting for receipt of the connection request frame by using the parameter values included in the received start instruction. More specifically, wireless communicator 24 starts the operation of waiting for receipt of the connection request frame by using the parameter values determined by controller 22 (step S30).

Next, wireless communicator 24 checks whether the connection request frame transmitted as a wireless signal has been received through antenna 25 (step S31).

As a result of the check in step S31, if the connection request frame has not been received, the process shifts to the operation of step S31. Therefore, wireless communicator 24 continues to check whether the connection request frame has been received.

On the other hand, as a result of the check in step S31, if the connection request frame is received, wireless communicator 24 notifies controller 22 of the reception notification indicating the reception of the connection request frame.

Controller 22 that has received the reception notification output from wireless communicator 24 shifts the operation state of wireless communication apparatus 20 from the connection waiting state to the normal state (step S32). The normal state is a state that allows transmitting predetermined information, such as the incoming call information, from wireless communication apparatus 20 to the peripheral device as the transmission source of the connection request frame.

In this way, in the exemplary embodiment, each of peripheral devices 10-1 to 10-*n* as a transmission source of the connection request command transmits the connection request parameter information indicating the timing of transmitting the connection request command.

Wireless communication apparatus 20 as a transmission destination of the connection request command receives the connection request parameter information transmitted from each of peripheral devices 10-1 to 10-*n*. Wireless communication apparatus 20 determines the timing of performing the operation of waiting for receipt of the connection request command transmitted from the peripheral device based on the timing indicated by the received connection request parameter information.

As a result, power can be efficiently consumed when waiting for receipt of the connection request. Furthermore, power saving performance can be ensured by efficiently consuming the power.

Second Exemplary Embodiment

In the first exemplary embodiment, the case in which wireless communication apparatus 20 acquires the connection request parameter information by using NFC communication has been described.

In the present exemplary embodiment, a case in which wireless communication apparatus 20 acquires the connection request parameter information by receiving the connection request frame will be described.

Figure 6:
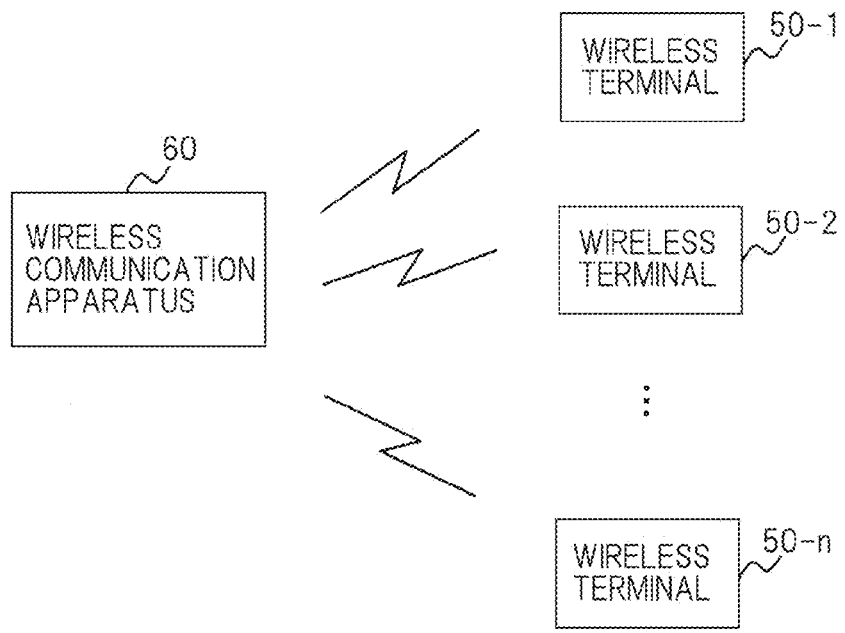
FIG. 6 is a block diagram showing a configuration of a second exemplary embodiment of the wireless communication system of the present invention.

FIG. 6 is a block diagram showing a configuration of a secondary exemplary embodiment of the wireless communication system of the present invention.

As shown in FIG. 6, the wireless communication system according to the exemplary embodiment includes wireless terminals 50-1 to 50-n that are transmission source communication apparatuses and wireless communication apparatus 60 that is a transmission destination communication apparatus.

Wireless terminals 50-1 to 50-n and wireless communication apparatus 60 shown in FIG. 6 are different from peripheral devices 10-1 to 10-n and wireless communication apparatus 20 in the first exemplary embodiment in that the NFC communication is not performed.

However, like peripheral devices 10-1 to 10-n in the first exemplary embodiment, wireless terminals 50-1 to 50-n are, for example, wristwatches that are compliant with Bluetooth Low Energy. Like wireless communication apparatus 20 in the first exemplary embodiment, wireless communication apparatus 60 is, for example, a portable terminal compliant with Bluetooth Low Energy.

Figure 7A:
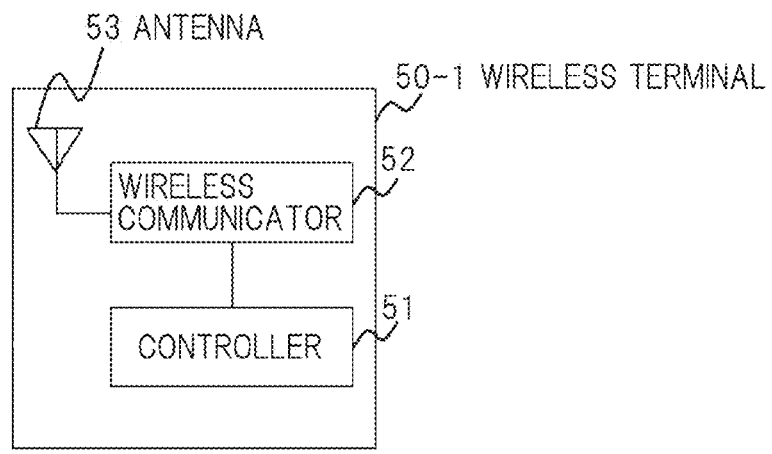
FIG. 7A is a block diagram showing a configuration example of a wireless terminal shown in FIG. 6.
Figure 7B:
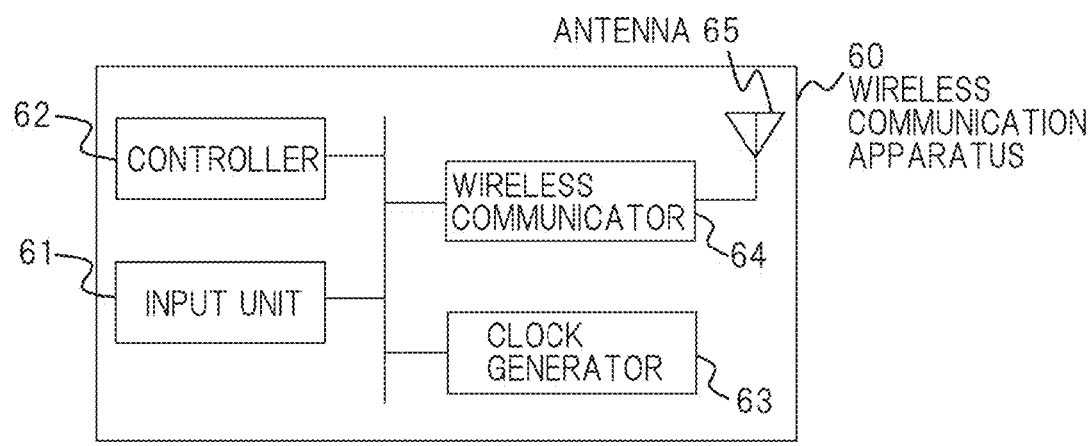
FIG. 7B is a block diagram showing a configuration example of a wireless communication apparatus shown in FIG. 6.

FIG. 7A is a block diagram showing a configuration example of wireless terminal 50-1, and FIG. 7B is a block diagram showing a configuration example of wireless communication apparatus 60. Wireless terminals 50-2 to 50-n also have the same configuration as that of wireless terminal 50-1.

As shown in FIG. 7A, wireless terminal 50-1 includes controller 51, wireless communicator 52 for performing communication by short-distance wireless communication, and antenna 53 for transmitting and receiving wireless signals by short-distance wireless communication.

Like controller 11 in the first exemplary embodiment, controller 51 stores connection request parameter information. Controller 51 outputs, to wireless communicator 52, a transmission instruction for instructing transmission of a connection request command based on the stored connection request parameter information. In this case, controller 51 checks whether this is the first transmission of the connection request command to the transmission destination. If the connection request command has been transmitted, there is available authentication information that authenticates the transmission destination, and controller 51 can check whether this is the first transmission of the connection request command to the transmission destination based on the presence or absence of the authentication information. As a result of the check, if this is the first transmission of the connection request command, controller 51 outputs a transmission instruction including the stored connection request parameter information to wireless communicator 52.

Wireless communicator 52 transmits and receives wireless signals through antenna 53. When the transmission instruction output from controller 51 is received, wireless communicator 52 generates a connection request frame. Wireless communicator 52 then transmits a wireless signal including the generated connection request frame through antenna 53. However, if a transmission instruction including the connection request parameter information is received, wireless communicator 52 stores the connection request parameter information in the header of the generated connection request frame.

Figure 8:
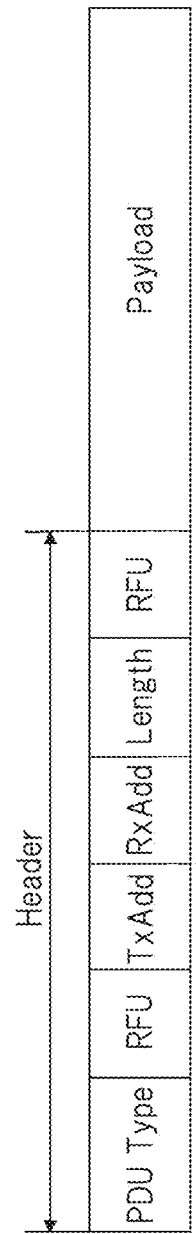
FIG. 8 is a diagram showing an example of a configuration of a frame generated by a wireless communicator shown in FIG. 7A.

FIG. 8 is a diagram showing an example of a configuration of a frame generated by wireless communicator 52 illustrated in FIG. 7A.

As shown in FIG. 8, the frame includes a payload, which stores content of a command, information, and the like, and a header. The header includes fields for storing a device address (TxAdd) of the transmission source, a device address (RxAdd) of the destination, and the like.

When a transmission instruction including the connection request parameter information is received, wireless communicator 52 generates a connection request frame that stores the connection request parameter information in an RFU (Reserved For Future Use) field of the header of the frame shown in FIG. 8. Although two RFU fields are illustrated in FIG. 8, wireless communicator 52 stores the connection request parameter information in a predetermined RFU field of the two RFU fields.

As shown in FIG. 7B, wireless communication apparatus 60 includes input unit 61, controller 62, clock generator 63, wireless communicator 64 as first and second receivers for performing communication by short-distance wireless communication, and antenna 65 for transmitting and receiving wireless signals by short-distance wireless communication.

The configurations and the operation of input unit 61 and clock generator 63 are the same as the configurations and the operation of input unit 21 and clock generator 23 in the first exemplary embodiment, respectively, and the description will not be repeated here.

Like wireless communicator 24 in the first exemplary embodiment, wireless communicator 64 performs an operation of waiting for receipt of the connection request frame transmitted as a wireless signal according to the instruction from controller 62. If the connection request parameter information is stored in the RFU field of the connection request frame header received during the operation, wireless communicator 64 acquires the device address and the connection request parameter information of the transmission source stored in the header. Wireless communicator 64 also acquires the clock value from clock generator 63. Wireless communicator 64 then outputs the acquired device address, the connection request parameter information, and the clock value to controller 62.

Like controller 22 in the first exemplary embodiment, controller 62 includes a register. When the device address, the connection request parameter information, and the clock value output from wireless communicator 64 are received, controller 62 associates and stores the received device address and the connection request parameter information in the register as shown in FIG. 3A.

Controller 62 further associates and stores the received device address and the clock value in the register.

When the selection information output from input unit 21 is received, controller 62 shifts the operation state of wireless communication apparatus 60 from the normal state to the connection waiting state, like controller 22 in the first exemplary embodiment.

When wireless communication apparatus 60 is in the connection waiting state, controller 62 determines parameter values of connection request waiting parameters. Details of the operation of controller 62 when wireless communication apparatus 60 is in the connection waiting state will be described in an operation flow described later.

Hereinafter, operation of the wireless communication system configured as described above will be described.

Figure 9A:
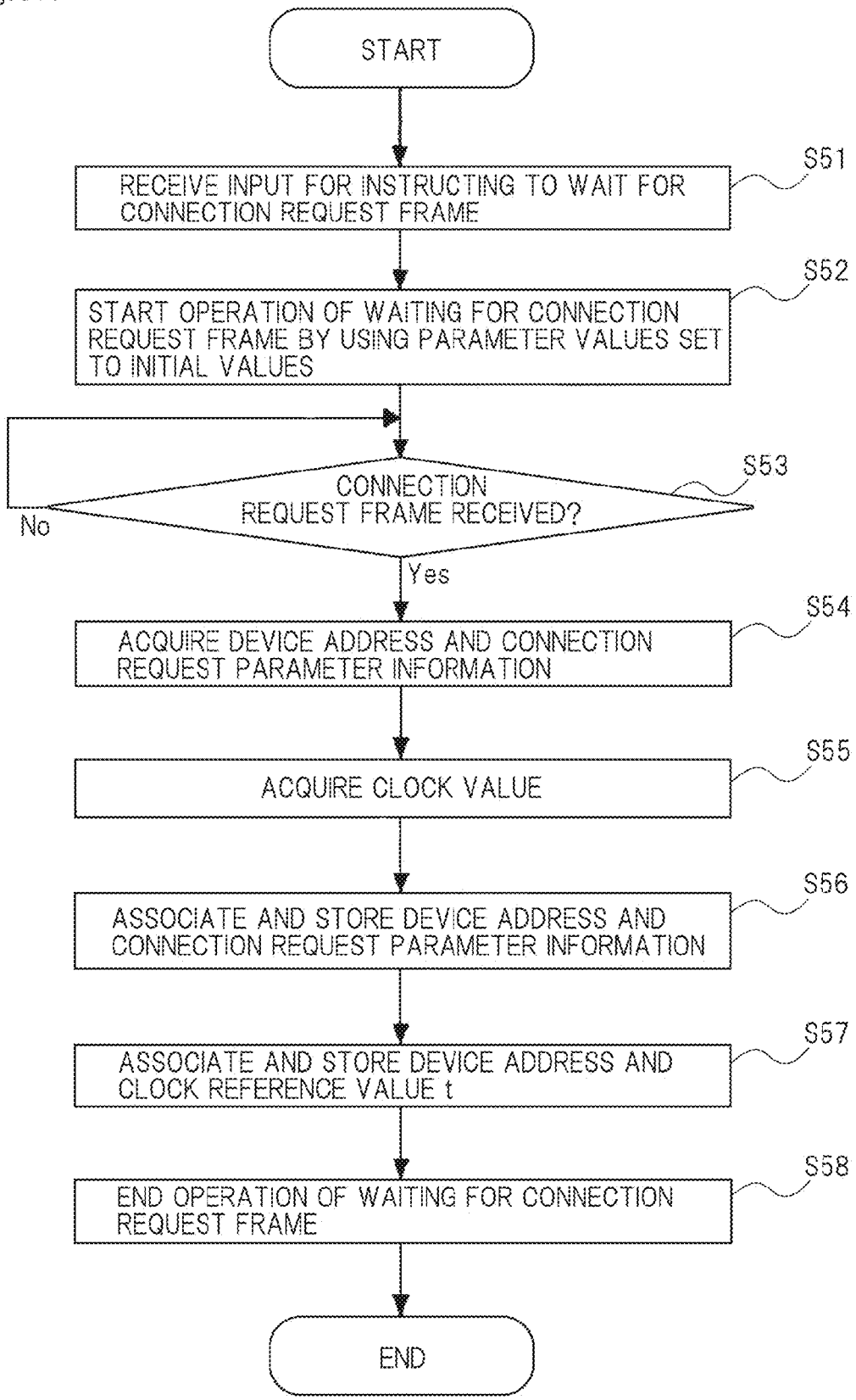
FIG. 9A is a flow chart for describing operation when the wireless communication apparatus shown in FIG. 6 stores connection request parameter information of the wireless terminal
Figure 9B:
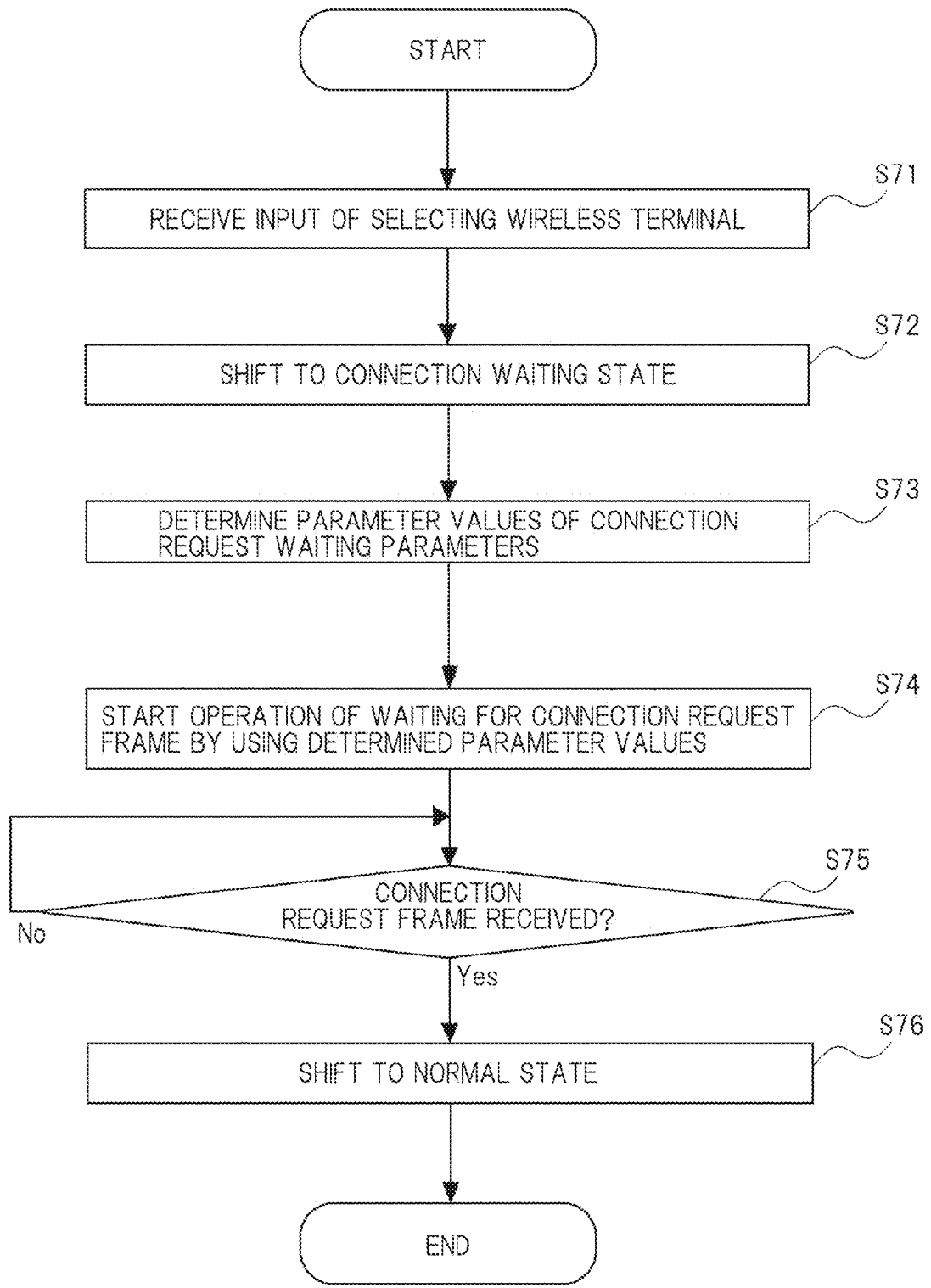
FIG. 9B is a flow chart for describing operation when the wireless communication apparatus shown in FIG. 6 waits for a connection request frame.

FIG. 9A is a flow chart for describing operation when wireless communication apparatus 60 stores the connection request parameter information of wireless terminal 50-1, and FIG. 9B is a flow chart for describing operation when wireless communication apparatus 60 waits for the connection request frame.

First, the operation when wireless communication apparatus 60 stores the connection request parameter information of wireless terminal 50-1 will be described with reference to FIG. 9A. Here, a case in which authentication is not performed between wireless terminal 50-1 and wireless communication apparatus 60, that is, a case in which wireless terminal 50-1 transmits the connection request frame to wireless communication apparatus 60 for the first time, will be described.

Input unit 61 receives, from the user, input that instructs that an operation to wait for receipt of the connection request frame (step S51) be performed.

Input unit 61 then outputs, to controller 62, a waiting instruction notification indicating that the input has been received that instructs that an operation to wait for receipt of the connection request be performed.

Controller 62 that has received the waiting instruction notification output from input unit 61 sets the parameter values of the connection request waiting parameters to predetermined initial values. The initial values are the same as those described in the first exemplary embodiment.

Controller 62 then outputs, to wireless communicator 64, a start instruction instructing that an operation to wait for receipt of the connection request frame by using the determined parameter values that are set to the initial values be started. The start instruction includes the parameter values set to the initial values.

Wireless communicator 64 that has received the start instruction output from controller 62 starts the operation of waiting for receipt of the connection request frame by using the parameter values included in the received start instruction. More specifically, wireless communicator 64 starts the operation of waiting for receipt of the connection request frame by using the parameter values set to the initial values (step S52).

Wireless communicator 64 then checks whether the connection request frame transmitted as a wireless signal has been received through antenna 65 (step S53).

As a result of the check in step S53, if the connection request frame has not been received, the process shifts to the operation of step S53. Therefore, wireless communicator 64 continues to check whether the connection request frame has been received.

On the other hand, as a result of the check in step S53, if the connection request frame has been received, wireless communicator 64 acquires the device address and the connection request parameter information of the transmission source stored in the header of the received connection request frame (step S54).

Wireless communicator 64 also acquires the clock value from clock generator 63 (step S55).

Wireless communicator 24 then outputs the acquired device address, the connection request parameter information, and the clock value to controller 62.

Controller 62 that has received the device address, the connection request parameter information, and the clock value output from wireless communicator 64 associates and stores the received device address and the connection request parameter information in the register (step S56).

Controller 62 further sets clock reference value t to the received clock value and stores clock reference value t in the register in association with the received device address (step S57).

Next, controller 62 outputs, to wireless communicator 64, an ending instruction that instructs that an operation to perform waiting for receipt of the connection request frame be ended.

Wireless communicator 64 that has received the ending instruction output from controller 62 ends the operation of waiting for receipt of the connection request frame (step S58).

Next, operation when wireless communication apparatus 20 waits for receipt of the connection request frame will be described with reference to FIG. 9B.

Input unit 61 receives, from the user, input of selecting one of the wireless terminals identified by the device addresses stored in the register of controller 62 (step S71).

Input unit 61 then outputs, to controller 62, a selection instruction notification including the device address for identifying the selected wireless terminal.

Controller 62 that has received the selection instruction notification output from input unit 61 shifts the operation state of wireless communication apparatus 60 from the normal state to the connection waiting state (step S72).

Next, controller 62 acquires clock reference value t associated with the device address included in the received selection instruction notification from among clock reference values t stored in the register.

Next, controller 62 calculates an operation start reference value by subtracting x from acquired clock reference value t.

Next, controller 62 determines the parameter values of the connection request waiting parameters based on the parameter values indicated by the connection request parameter information associated with the device address included in the received selection instruction notification in the connection request parameter information stored in the register and based on calculated operation start reference value (t−x) (step S73).

Controller 62 then outputs, to wireless communicator 64, a start instruction instructing that an operation to wait for receipt of the connection request frame by using the determined parameter values be started. The start instruction includes the determined parameter values.

Wireless communicator 64 that has received the start instruction output from controller 62 starts the operation of waiting for receipt of the connection request frame by using the parameter values included in the received start instruction. More specifically, wireless communicator 64 starts the operation of waiting for receipt of the connection request frame by using the parameter values determined by controller 62 (step S74).

Next, wireless communicator 64 checks whether the connection request frame transmitted as a wireless signal has been received through antenna 65 (step S75).

As a result of the check in step S75, if the connection request frame has not been received, the process shifts to the operation of step S75. Therefore, wireless communicator 64 continues to check whether the connection request frame ha been received.

On the other hand, as a result of the check in step S75, if the connection request frame has been received, wireless communicator 64 notifies controller 62 of a reception notification indicating that the connection request frame has been received.

Controller 62 that has received the reception notification output from wireless communicator 64 shifts the operation state of wireless communication apparatus 60 from the connection waiting state to the normal state (step S76).

In this way, in the exemplary embodiment, each of wireless terminals 50-1 to 50-n as a transmission source of the connection request command transmits the connection request parameter information indicating the timing of performing the operation of transmitting the connection request command.

Wireless communication apparatus 60 as a transmission destination of the connection request command receives the connection request parameter information transmitted from each of wireless terminals 50-1 to 50-n. Wireless communication apparatus 60 then determines the timing of performing the operation of waiting for receipt of the connection request command transmitted from the wireless terminal based on the timing indicated by the received connection request parameter information.

As a result, the same advantageous effects as the advantageous effects in the first exemplary embodiment can be obtained.

In the first and second exemplary embodiments, the case in which the wireless communication apparatus determines the parameter values of the connection request waiting parameters based on the connection request parameter information stored in the peripheral device or the wireless terminal and based on operation start reference value (t–x) has been described. Other than this, based on the connection request parameter information and according to, for example, the length of time permitted from the execution of the connection request to the establishment of the connection, the parameter values of the connection request waiting parameters may be decided such that power consumption in the wireless communication apparatus will be efficient.

For example, time obtained by multiplying the connection request interval time by a coefficient according to the permitted time can be set as the connection request waiting interval time, and the connection request waiting time width can be larger than the connection request interval time. As a result, the probability that the wireless communication apparatus can receive the connection request frame can be increased. This is particularly effective when the period of the connection request interval time is short.

Although the present invention has been described with reference to the exemplary embodiments, the present invention is not limited to the exemplary embodiments. Various changes that can be understood by those skilled in the art can be made in relation to the configurations and the operation of the present invention without departing from the scope of the present invention.

For example, in the flow of FIG. 5B, the arrow after the process of the block of step S28 may be connected to the block of step S21, instead of the block of step S29.

Based on the flow, the following communication system may be provided.

In a communication system that includes a plurality of communication apparatuses and that transmits and receives a connection request command between the plurality of communication apparatuses to establish a connection between the plurality of communication apparatuses, a transmission source communication apparatus as a transmission source of the connection request command from among the plurality of communication apparatuses transmits transmission timing information that indicates timing at which the connection request command is transmitted, and a transmission destination communication apparatus as a transmission destination of the connection request command from among the plurality of communication apparatuses receives the transmission timing information transmitted from the transmission source communication apparatus and determines, based on the timing indicated by the received transmission timing information, waiting timing at which an operation of waiting for receipt of the connection request command transmitted from the transmission source communication apparatus is performed. The transmission source communication apparatus transmits the connection request command. The transmission destination communication apparatus receives the connection request command transmitted from the transmission source communication apparatus and determines waiting timing at which an operation of waiting for receipt of the next connection request command transmitted from the transmission source communication apparatus is performed based on timing of the reception of the connection request command and based on the timing indicated by the received transmission timing information.

This application claims the benefit of priority based on Japanese Patent Application No. 2011-208702 filed Sep. 26, 2011, the entire disclosure of which is hereby incorporated by reference.

The invention claimed is:

1. A communication system that comprises a plurality of communication apparatuses and that transmits and receives a connection request command between said plurality of communication apparatuses to establish a connection between said plurality of communication apparatuses, wherein
   a transmission source communication apparatus as a transmission source of the connection request command from among said plurality of communication apparatuses transmits transmission timing information indicating timing of transmitting the connection request command,
   a transmission destination communication apparatus as a transmission destination of the connection request command from among said plurality of communication apparatuses receives the transmission timing information transmitted from said transmission source communication apparatus and determines, based on the timing indicated by the received transmission timing information, waiting timing at which an operation of waiting for receipt of the connection request command transmitted from said transmission source communication apparatus is performed, and
   said transmission timing information includes:
      a connection request interval time that defines transmission intervals of the connection request command;
      a connection request time-out time that defines a period of time during which the transmission of the connection request command is continued at the transmission intervals of the connection request interval time; and
      a connection request rest time that defines a period of time during which the connection request command is not transmitted after the connection request time-out time.

2. The communication system according to claim 1, wherein
   said transmission source communication apparatus transmits the connection request command, and
   said transmission destination communication apparatus receives the connection request command transmitted from said transmission source communication apparatus and determines the waiting timing based on timing of the reception of the connection request command and based on the timing indicated by the received transmission timing information.

3. The communication system according to claim 2, wherein
said transmission source communication apparatus transmits a wireless signal that includes the connection request command and the transmission timing information, and
said transmission destination communication apparatus receives the wireless signal transmitted by said transmission source communication apparatus.

4. A communication apparatus that receives a transmitted connection request command to establish a connection with a transmission source communication apparatus as a transmission source of the connection request command, the communication apparatus comprising:
a first receiver that receives transmission timing information that is transmitted from said transmission source communication apparatus and that indicates timing at which said transmission source communication apparatus transmits the connection request command; and
a controller that determines, based on the transmission timing information received by said first receiver, waiting timing at which an operation of waiting for receipt of the connection request command transmitted from said transmission source communication apparatus is performed;
wherein said transmission timing information includes:
a connection request interval time that defines transmission intervals of the connection request command;
a connection request time-out time that defines a period of time during which the transmission of the connection request command is continued at the transmission intervals of the connection request interval time; and
a connection request rest time that defines a period of time during which the connection request command is not transmitted after the connection request time-out time.

5. The communication apparatus according to claim 4, further comprising
a second receiver that receives the connection request command transmitted from said transmission source communication apparatus, wherein
said controller determines the waiting timing based on timing of the reception of the connection request command by said second receiver and based on the timing indicated by the transmission timing information received by said first receiver.

6. The communication apparatus according to claim 5, wherein
said first receiver receives a wireless signal that includes the transmission timing information, and
said second receiver receives a wireless signal that includes the connection request command.

7. A communication method in a communication system that comprises a plurality of communication apparatuses and that transmits and receives a connection request command between said plurality of communication apparatuses to establish a connection between said plurality of communication apparatuses, the communication method comprising:
transmitting, by a transmission source communication apparatus, as a transmission source of the connection request command from among said plurality of communication apparatuses, transmission timing information that indicates timing at which the connection request command is transmitted;
receiving, by a transmission destination communication apparatus, as a transmission destination of the connection request command from among said plurality of communication apparatuses, the transmission timing information transmitted from said transmission source communication apparatus; and
determining, by said transmission destination communication apparatus, waiting timing at which an operation of waiting for receipt of the connection request command transmitted from said transmission source communication apparatus based on the timing indicated by the received transmission timing information is performed;
wherein said transmission timing information includes:
a connection request interval time that defines transmission intervals of the connection request command;
a connection request time-out time that defines a period of time during which the transmission of the connection request command is continued at the transmission intervals of the connection request interval time; and
a connection request rest time that defines a period of time during which the connection request command is not transmitted after the connection request time-out time.

8. The communication method according to claim 7, further comprising:
transmitting, by said transmission source communication apparatus, the connection request command;
receiving, by said transmission destination communication apparatus, the connection request command transmitted from said transmission source communication apparatus; and
determining, by said transmission destination communication apparatus, the waiting timing based on timing at which the connection request command is received and based on the timing indicated by the received transmission timing information.

9. The communication method according to claim 8, further comprising:
transmitting, by said transmission source communication apparatus, a wireless signal that includes the transmission timing information;
transmitting, by said transmission source communication apparatus, a wireless signal that includes the connection request command; and
receiving, by said transmission destination communication apparatus, the wireless signals transmitted by said transmission source communication apparatus.

10. A communication method in a communication apparatus that receives a transmitted connection request command to establish a connection with a transmission source communication apparatus as a transmission source of the connection request command, said communication method comprising:
receiving transmission timing information that is transmitted from said transmission source communication apparatus and that indicates timing at which said transmission source communication apparatus transmits the connection request command; and
determining, based on the received transmission timing information, waiting timing at which an operation of waiting for receipt of the connection request command transmitted from said transmission source communication apparatus is performed;
wherein said transmission timing information includes:
a connection request interval time that defines transmission intervals of the connection request command;
a connection request time-out time that defines a period of time during which the transmission of the connection request command is continued at the transmission intervals of the connection request interval time; and a connection request rest time that defines a period of time during which the connection request command is not transmitted after the connection request time-out time.

11. The communication method according to claim 10, further comprising:

receiving the connection request command transmitted from said transmission source communication apparatus; and determining the waiting timing based on timing of the reception of the connection request command and based on the timing indicated by the received transmission timing information.

12. The communication method according to claim 11, further comprising:

receiving a wireless signal that includes the transmission timing information transmitted from said transmission source communication apparatus; and receiving a wireless signal that includes the connection request command transmitted from said transmission source communication apparatus.

\* \* \* \* \*